US006623156B1

(12) United States Patent
Meinander (10) Patent No.: US 6,623,156 B1
(45) Date of Patent: Sep. 23, 2003

(54) METHOD FOR MIXING A FLUID MASS (75) Inventor: Paul Olof Meinander, Grankulla (FI)

(73) Assignee: POM Technology Oy AB, Helsinki (FI)

( * ) Notice: Subject to any disclaimer, the term of this patent is extended or adjusted under 35 U.S.C. 154(b) by 0 days.

(21) Appl. No.: 09/622,829

(22) PCT Filed: Feb. 23, 1999

(86) PCT No.: PCT/FI99/00143

§ 371 (c)(1),
(2), (4) Date: Sep. 26, 2000

(87) PCT Pub. No.: WO99/43886

PCT Pub. Date: Sep. 2, 1999

(30) Foreign Application Priority Data

Feb. 24, 1998 (FI) .................................................. 980418

(51) Int. Cl.[7] .................................................. B01F 7/08
(52) U.S. Cl. ...................... 366/300; 366/301; 162/57
(58) Field of Search ........................ 366/83–85, 96–97, 366/297–301, 318, 319, 321; 162/57, 243

(56) References Cited

U.S. PATENT DOCUMENTS

| 409,409 | A | * | 8/1889 | Langer |
| 506,384 | A | * | 10/1893 | Werner |
| 4,093,419 | A | * | 6/1978 | Tauber et al. |
| 4,474,475 | A | * | 10/1984 | Moriyama |
| 5,156,872 | A | * | 10/1992 | Lee |
| 5,381,730 | A | * | 1/1995 | Kim |
| 5,651,305 | A | * | 7/1997 | Bushman et al. |
| 5,863,197 | A | * | 1/1999 | Boy et al. |

FOREIGN PATENT DOCUMENTS

| EP | 0 144 301 A1 | 6/1985 |
| FI | 35 879 | 1/1967 |
| FI | 49 332 | 1/1975 |
| SE | 210 862 | 2/1967 |
| WO | WO 7900345 | 6/1979 |

* cited by examiner

*Primary Examiner*—Charles E. Cooley
(74) *Attorney, Agent, or Firm*—Browdy and Neimark PLLC (57) ABSTRACT

Method and apparatus for treating a fluid mass or stock, particularly couch stock or the like in paper making. Stock material is fed to a vessel having a mixing arrangement comprising rotatably arranged processing means. At least two processing means are caused to rotate mutually adjacent in opposite directions and substantially horizontally. The stock at the upper surface of the means is conveyed towards a wall potion of the vessel, whereby spirals arranged in an inclined manner at a core of the processing means bring the stock into channels defined by the core, by the spirals, and by the wall portion of the vessel, and further towards a constriction formed by the spiral elements running in an intermeshed manner, while a part of the stock is forced in a direction away from a discharge of the vessel.

6 Claims, 4 Drawing Sheets

METHOD FOR MIXING A FLUID MASS

CROSS REFERENCE TO RELATED APPLICATIONS

The present application is the national stage under 35 U.S.C. 371 of PCT/FI99/00143, filed Feb. 23, 1999.

BACKGROUND OF THE INVENTION

1. Field of the Invention

The present invention relates to a method for treating a fluid mass wherein a mass material is fed to vessel or trough having a mixing device comprising rotatably arranged processing means, wherein at least two of the processing means are caused to rotate in opposite directions and essentially horizontally adjacent to one another. The present invention also relates to a method for treating a couch mass or the like, wherein couch mass and dilution water are caused to fall down into a couch pit comprising a trough and a mixing arrangement. Thus, in more general terms the present invention relates to methods for treating a fluid mass or stock and especially a method for treating a couch mass or the or the like, wherein the mass or stock material is fed to a vessel or trough having a mixing device comprising rotatably arranged processing means. The present invention further relates to a processor arrangement for a fluid mass or stock, said arrangement comprising a vessel or trough for the reception of the respective mass or stock, a processing device such as a mixing arrangment arranged in the vessel and comprising horizontally arranged rotatable cylinder body means provided with spirals, as well as a discharge for treated or processed mass or stock. The cylinder means comprise at least two cylinders arranged for rotation counter each other. The invention further relates to a specific use of the method and the arrangement.

2. Technical Background

In paper manufacturing trimmed strips are cut from a wet web, and additionally wet broke material will be generated at the wire and the press section in connection with a web break. Usually the wet broke material is collected, disintegrated and diluted in a pulper comprising a container with a powerful mixing feature and thereafter it is returned to the process.

For the disintegration to function properly the pulper must comprise a sufficient amount of mass or stock which is maintained under a powerful mixing by the disintegration means of the pulper. During regular processing the amount of stock brought to the pulper corresponds to a minor part of a paper machine's production. At web breaks, changes of quality and machine stops the amount of stock may temporarily rise to an amount corresponding to the total production capacity of the machine.

In order to achieve a satisfactory mixing and disintegration effect the stock in the pulper must be kept highly diluted and a sufficiently large volume of mass must be kept therein. This leads to a high power demand for the disintegration and mixing.

At a web break the water consumption rises greatly and for this purpose a water reserve must be arranged corresponding to the demand at a typical web break. After the disintegration the wet broke material usually is de-watered in a separate de-watering device for better correspondence with the production consistency and for retrieving the water therefrom.

At production changes, especially at a change of color, there will exist a large amount of wet broke material from the earlier paper quality, which amount cannot be used for the next quality. The wet broke material in circulation in the system will also make the attaining of the new paper quality slower and results in productional losses and change-over broke masses.

In this respect it is also of importance that the pulper can be easily and completely emptied of its contents, which is not the case for typical pulpers.

Many paper machines have a low and narrow wire section which does not provide space for the construction of an appropriate pulper. In this case vaulting and broke stocking problems will arise and the pulper itself can be difficult to maintain and service.

Corresponding problems occur in other productions where a mass or different streams of components should be processed in order to achieve a homogenous mass.

Usually the wet broke mass is diluted to a 2 to 3 percent consistency in a couch pit or wire pulper. Depending on the structure of the paper machine a similar pulper may also be arranged in connection with the press section. Depending on the size of the machine the wire pulper is typically between five and fifty cubic meters and it comprises a powerful mixer which breaks up fibre bundles and pieces of paper. For an effective function the pulper requires a good mixing which, in turn, requires a sufficient dilution. Since the pulper works under varying conditions the dilution usually is over-dimensioned according to the most critical situation.

3. Description of Related Art

Publication No. SE-210862 describes a device for processing a material mass in particulate or suspension form, especially for de-fibration of a cellulose material, in which device at least two band spirals are arranged mutually adjacent in a shell having inlet and outlet openings, said spirals being arranged for spaced intermeshed common rotation. Their spiral surfaces are directed generally radially.

Since the device known from SE-210862 has defined inlet and outlet openings and a mainly unbroken axial path of flow it is unsuitable for processing a broke mass which will fall down over the whole width of a paper machine. The axial spiral surfaces give a processing of the mass in a axial direction, and the mixing of the mass which takes place does so because the band spirals will cut through the mass, which provides only a local turbulence and permits the mass to stagnate within the device. A clearance between the band spirals and said shell has also been provided in order to permit this kind of mixing, and separate screws take care of the feeding of the mass through said outlet.

U.S. Pat. No. 2,797,623 discloses a worm conveyor by which broke mass can be transported out from a paper machine. The worm conveyor comprises a screw in which the broke in a traditional manner is brought along a flute. For this transport to function the spiral surfaces of the screw must be arranged essentially radially. Broke falling into the conveyor will thereby be transported straight through the conveyor without any significant mixing.

Publication No. DE-401033 discloses a mixing and transport arrangement having two intermeshed band spirals. Since they are rotating against each other, the material transported by them will be processed in an alternating manner by one or the other of the spirals and thereby a mixing action will be generated. This mixing action thus comprises the spirals moving through the material to be mixed and simultaneously transporting it forwards. A mixing in this kind of agitator requires an easy flowing material and there is a risk, if the screws fill up, for a standing circulation to be caused, since the material can easily flow through hollow portions in the spirals.

Especially in small old paper machines the agitator in the couch pit has been formed as a spiral, with the idea of its pressing the broke material towards the outlet of the couch pit. These spirals, however, have been inefficient in that they have not ground up the broke and have not provided a sufficient power, and thus the broke has been able to vault and block the outlet.

From the pulper the broke is usually transported via a thickener to the machine's stock chest where it is mixed with fresh stock. This can be arranged in many ways, depending on the machine's product and equipment. It is usual to combine the thickening of broke with the recovering of fibers in a disk or drum filter.

At a change of quality the broke can be directed to separate collecting tanks from which it is gradually dosed into the stock. In many cases, especially in the manufacturing of colored paper, the broke generated at a change of quality can no longer be added to the process but will be directed to the waste water treatment where the solid material is recovered for incineration or deposition on a waste dump.

Usually the generated broke will be struck from the wire by high pressure water which simultaneously dilutes the broke. There have, however, been developed methods for mechanically dislocating broke, one method used including feeding it over a guiding roll having a doctor blade. Hereby the desire has been to avoid an unnecessary dilution of the broke. There is, however, the problem that broke of a higher consistency tends to vault, which is accentuated by a more difficult mixing.

The object of the present invention is to provide a method and an arrangement for an efficient continuous homogenization of a mass flow, for example wet broke in a paper machine or another fluid mass comprising more or less solid components which are to be disintegrated and/or mixed into a liquid type fluid.

One object of the invention is to minimize the processed amount of mass, which minimizes the loss of time and material at a change and shutdown of the process.

An object of the invention is also to provide a method for handling for example wet broke of high consistency, due to which the need for diluting water and a subsequent thickening is eliminated.

A further object of the invention is to provide (a vaulting and blocking free handling of, for example, broke, also in narrow spaces.

A further object of the invention is to provide an energy saving method for handling of, for example, wet broke.

One object of the invention is to provide an apparatus capable of treating, for example, wet broke in a small volume and one which permits a simple and complete emptying of the same.

One object of the invention is also to provide an apparatus capable of treating, for example, broke of a high and varying consistency.

One further object of the invention is to provide an apparatus of small dimensions which also in narrow spaces is capable of treating, for example, broke without a risk for vaulting and blocking.

One further object of the invention is to provide an apparatus which under a low energy consumption treats, for example, broke.

SUMMARY OF THE INVENTION

According to the invention the set objects are obtained by arranging, in a vessel, a system comprising spiral means operating counter to each other and in an intermeshing fashion in such a manner that the mass at the vessel's wall will reside in channels formed by said spirals, whereby the mass at the intermesh of said spirals will be pressed into a direction which differs from the traditional directions of transportation for the spirals.

Thus, the method according to the present invention is characterized in that at least two of the corresponding means are brought to rotate in opposite directions and essentially horizontally adjacent to one another so that the mass at the upper surface of the means is conveyed outwards towards the respective opposite side walls of said vessel, whereby the mass is brought, by several spiral elements arranged in an inclined manner at an essentially cylindrical core of the respective processing means, into generally inclined channels delimited by the core, by the walls at respective two adjacent spiral elements, and by the vessel's wall portions adjacent to the respective spiral element, and further towards a constriction or choke formed by the respective intermeshing spiral elements at adjacent processing means.

DESCRIPTION OF THE PREFERRED EMBODIMENTS

Favorably the method comprises bringing a part of said mass to be pressed against at least one outlet arranged in the vessel, by controlling the spiral elements' rotation and pitch around the core and/or the vessel's inlet and/or outlet parameters, the rest of said mass being pressed, suitably under the impact of at least one gable end of said vessel and/or the impact of the spirals acting in an intermeshed manner, through the channels and into a direction away from the outlet and/or up over the upper surface of the processing means to join the mass being fed into the process.

A method according to another embodiment of the invention, especially arranged for treatment of couch mass, is characterized by bringing at least two essentially vertically arranged spiral cylinders of said mixing arrangement to rotate in an intermeshed manner counter to each other so that mass dropping down will be transported by said spirals outwards against the respective outer sides of the couch pit, where the mass is drawn in into channels formed by adjacent spirals, by the respective core bodies of the cylinders and by a wall of the trough so that the mass will be conveyed towards a constriction formed by the cylinder cores and the mutual intermesh of said spirals, whereby a portion of the mass will be pressed towards an outlet, a portion of the mass will circulate in channels formed at the constriction, and surplus mass will be pressed backwards through said channels.

According to a preferred embodiment of the method the amount of dilution water is controlled according to the width of the down-falling paper web constituting the couch mass, suitably to obtain a consistency corresponding to the consistency of the fresh stock in a paper manufacturing process and suitably so that the stock is returned to a mass processor without a preceding thickening. Hereby the returned amount is suitably restricted to a pre-defined proportion of the total stock while any surplus amount suitably will be fed to a collecting tank and/or so that, at a change in the paper machine, the level in said the pit is restricted to a minimum by controlling the rotation of the spiral cylinders, by choking the outlet or in another way.

The arrangement according to the invention is especially characterized in that the cylinder means comprises at least two cylinders arranged for rotation counter to each other, respective spiral means extending directly from the surface of each respective cylinder core to the vicinity of a respective wall section of said vessel, said cylinders being arranged so that the spiral means at least in pairs intermesh to define generally inclined horizontal channels having a smaller cross section than those channels which at each respective cylinder are formed between adjacent spirals, the cylinder core and a wall section of the vessel.

The direction of rotation for each respective cylinder is suitably such that the mass at least at the outermost cylinders is pressed by the spiral means against the side walls of the vessel and downwards along them towards a favorably respective semi-circular portion of the vessel and suitably towards the vessel's outlet and, respectively, towards the vessel's gable walls. The dimensions of the inlet and outlet, respectively, are suitably such that the mass, due to the rotation of the spiral means, is at least partially pressed through the channels in a direction away from the outlet, the system of spirals suitably being so tight that a pressure will be built up in front of the outlet.

According to a favorable embodiment of the invention each respective spiral cylinder comprises a core suitably in the shape of a displacement body having a considerable diameter in relation to the total diameter of the spiral cylinder. The diameter of the body is suitably at least 50 percent, preferably about 75 to 95 percent of the total diameter. The number of spirals on each cylinder is suitably more than one, preferably 4 to 40, where the spirals are arranged in such a manner that their pitch suitably is more than three diameters per turn, the angle ($\alpha$) between the outer edge of a spiral and the normal plane perpendicular to the axis of said cylinder then being more than 45° C. This angle $\alpha$ is preferably more than 60°, preferably about 65° to 85°. The spiral means are suitably arranged around each respective cylinder core along essentially the entire horizontal extent thereof.

According to a preferred embodiment the pitch of the spirals is such that the pitch corresponds to the length of the cylinder on about ½ to 1 turn. Thus the channels formed by the spirals will run from the inlet end of the arrangement almost to the outlet end thereof, and in certain cases, the whole way. The spirals according to the invention may in this preferred embodiment be defined as several parallel screws arranged on a common core, and here it should be noted that these spirals, in contrast to arrangements shown in the prior art, have such a shape and pitch that the processed material in practice cannot keep up with the spiral pitch, and that the spirals are not, at first hand, used for transportation of material but for mixing. The spirals do not normally gear into each other in a mutual contact, but instead an effective mixing action is achieved by pressing the material between the spirals and in the form of a leaking between the spiral edges and the vessel's walls.

According to an alternative embodiment the shape of the spirals is such that the spirals comprise a triangular, or in another manner, essentially two-dimensional cross section, while the embodiment disclosed in the appended figures comprises essentially blade-like structures. The dimensioning and individual structure of the spirals is suitably adapted according to the material to be processed, so that the spirals at the rotation do not to any essential degree bring air with them, while simultaneously the material to be processed has time to flow in between the spirals.

According to one embodiment of the invention the spiral cylinders are arranged in pairs and are rotatable so that the cylinders at the outer sides thereof, which sides are directed towards the vessel's wall, together with said wall or, respectively, at the area between any possibly existing adjacent other pairs of cylinders form a nip or wedge-shaped inlets for the mass, suitably so that each respective nip or wedge-shaped portion comprises a shearing/cutting edge portion co-acting with the spiral edge. According to another embodiment more than two spiral cylinders are arranged to interact suitably in pairs.

In the figures different embodiments are shown where the number of outlets varies. According to one embodiment the number of outlets is greater than one, whereby the spiral cylinders suitably are divided in sections, each leading to a respective outlet. According to another embodiment the outlet is centrally located, the spiral cylinders then suitably being divided in sections, each leading toward the center. According to a further embodiment each respective outlet is centrally located between the cylinders of the respective interacting pair of cylinders.

According to the invention a flow or flows to be homogenized is/are processed so that they are conveyed to a vessel or trough, on the bottom of which spiral shaped sets formed as intermeshing spiral cylinders rotate and feed the mass towards one or several outlet opening(s) . The spiral cylinders, consisting of a cylindrical core and spirals closely attached thereto, are brought to rotate so that their upper sides move away from each other, whereby said mass will be conveyed the outer way around the spiral cylinders towards their under side(s) . Here the intermeshing of the spirals will form a choked portion which partially prevents the mass from following the rotation of the spiral cylinder, and thus the mass will be pressed, by the spiral movement of the spiral, towards an outlet located under the spiral cylinders at their end.

The direction into which the mass will be pressed by the rotating spiral is the spiral's pitch direction, the spiral pitch being the distance between the spiral turns in the axial direction of the spiral cylinder. The higher the pitch the more acute the spiral angle will be, which angle is formed between the outer edges of the spirals and a normal plane imagined with respect to the axis of the spiral cylinder.

Traditional spiral conveyors usually have a pitch corresponding to one spiral diameter or less for each turn. In such a case the spiral angle will be 17.5° C. or less, the action of the spiral being, above all, forwarding in the direction of the axis, the mixing impact being insignificant. According to the present invention a mixing action is achieved by pressing the mass against a constriction between the cylinders and thus the mass is forced to flow through the channels formed by the spirals and the core or the vessel, and especially in a direction opposite to the spiral's aforesaid forwarding direction. In order to intensify this impact the spirals are suitably given a higher pitch so that the spiral angle α is 45° or suitably even more, corresponding to a pitch of about 3 times the spiral diameter or more. An especially good efficiency is achieved for spiral angles of 60° or more, corresponding to a pitch of 5.5 times the spiral diameter or more.

If one wishes to have more than one outlet the spiral cylinders are divided into sections having different pitch angles, so that mass will be conveyed to each of said outlets. Such outlets may be arranged at both ends of the spiral cylinders, or centrally. For centrally arranged outlets, the spiral sections are favorably chosen so that the pitch of the spiral sections meet at the outlet, which thus will be fed from two directions.

By utilizing multiple spirals, multiple flow channels are achieved. By letting the outer edge of the spirals extend into the near vicinity of the core of an adjacent spiral cylinder, the accessible volume for each unit of angle at the meshing point of the spirals will be half of the same in their free portion. Simultaneously, a labyrinth is achieved which prevents the mass from leaving the flow channels, and thus any surplus mass not received by the outlet will be forced to flow backwards along the channels in a direction which, thus, will be opposite to the direction in which the spirals at an open rotation would convey the mass.

The sides and/or the bottom of said vessel or trough are suitably shaped into a form which rather closely follows, at least for a part of the circumference, the periphery of the spiral cylinders. The trough around the spirals is favorably shaped to have semi-cylindric bottom sections so that the outer edge of the spirals adjacent to the outlet will pass closely near the trough in a sector corresponding to at least the distance between two spirals. Correspondingly, the spiral ends favorably are arranged so that they pass near the trough gable. Thus, at least one spiral at each side will press mass towards the outlet.

Since only a portion of the mass can rotate along with the spirals, that portion of the rest of the mass which is not conveyed towards the outlet openings will be forced into an opposite direction along channels formed by the spirals. The flow of mass will be accelerated and shearing forces will appear in the mass. These shearing forces contribute to the disintegration for example, fiber bundles and sheets of paper or other conglomerates of components of the mass to be processed, which components usually are more consistent in relation to the dilution fluid. Simultaneously, this partial flow directed counter to the main flow of the mass will contribute to an effective mixing and equalization of the mass composition.

To that part where the channels between the spirals are not closed by the semi-cylindrical sections of the trough, the surplus mass will be forced forwards along the channel and up in the trough, which further makes the mixing in the trough more efficient. By designing said semi-circular sections to cover a greater or lesser portion one can affect the portion of mass being forced backwards through said constriction or, respectively, forwards through the open channels.

If the transition between semi-cylindrical section and the side walls of the trough is made sharp the spirals will, at their rotation beyond this edge, shear off larger pieces of mass located near this edge. This facilitates the treatment of a mass comprising larger continuous sheets, which for instance may be the case for a paper machine where the couch mass has passed through a press.

Since it is desirable to have only a small amount of mass under treatment it is favorable to design the core of the spiral cylinders as a displacement body having a relatively large diameter, favorably at least half the spiral diameter. Especially favorably the core diameter may be about ¾ of the spiral diameter or more.

The larger the spiral pitch the higher number of spirals the spiral cylinders should comprise in order to achieve the desired channel effect. When the number of spirals is chosen it should be taken into consideration that the distance between the spirals should be selected in relation to the viscosity of the mass and the rotational speed of the spiral cylinders, so that the mass initially will have the time to fill the channels prior to reaching the semi-cylindrical portion of the trough. Typical combinations for the couch mass in a paper machine could be:

| Spiral diameter mm | Core diameter mm | Pitch at each turn, mm | Number of spirals on the cylinder |
| --- | --- | --- | --- |
| 600 | 300 | 2000 | 6 |
| 800 | 600 | 4000 | 16 |
| 1000 | 900 | 6000 | 40 |

For the homogenization of other media the dimensions may considerably differ from the above. For instance, for producing cosmetics, much smaller dimensions would be considered.

In the embodiments disclosed in the figures the spirals, as such, are relatively thin, but according to a special embodiment of the invention the spirals are made of displacing spirals having a tight fit, suitably so that adjacent spirals acting in an intermeshed manner to a considerable extent, suitably to 50 to 98 percent, fill up the void space between the cylinder cores. By such an arrangement an especially efficient mixing can be achieved, since the spirals constitute displacement bodies which totally or partially fill the channels in the constriction between the spiral cylinders. The thus achieved choke or partial choke of the re-flow through the channels in the constriction raises the pressure towards the outlet and bring about an especially forceful processing of the mass which leaks through the channels and the narrow slits between the spirals and the trough.

This corresponds to the action of pumping with screw pumps having a positive choke, and it can be utilized for feeding the mass forwards through the outlet without separate pumps.

The shredding effect at the flow through the channels can be made more efficient by arranging, as known per se, special shredding means at the spirals and/or at the cores.

A preferred embodiment is achieved with two spiral cylinders which are partially surrounded by a semi-cylindrical section of the trough bottom and side, the spiral cylinders rotating away from each other, viewed from above, so that the treated mass will be pulled outside of the pair of spiral cylinders towards the semi-cylindrical section and further in towards the nip formed where the spirals intermesh.

The spiral cylinders are made so that the gap between them is narrow. Preferably this can be achieved by utilizing multiple spirals and further by providing the spiral cylinders with a cylindrical core. Thus a labyrinth is achieved which prevents the mass from circulating along with the cylinders.

Most preferably the bottom of the trough is designed as semi-cylinders following the shape of the spiral cylinders and having a tangential transition to the trough side, thus constituting a wedge-like inlet. Hereby is achieved a maximally efficient mass introduction and the volume of the trough is minimized. At the same time the emptying is made easier since the spiral cylinder will pass over the trough bottom in its close vicinity. Alternatively, the transition to the trough side can favorably be designed as a sharp edge which together with the spirals constitutes a shearing tool.

In order to facilitate the emptying it is preferred to provide the trough bottom and the spiral cylinders with a slight inclination towards the outlet opening. A favourable inclination is of the order of 1 to 5 percent. A corresponding effect can also be achieved by making the spiral cylinders and/or the spiral elements slightly conical in a corresponding manner.

The outlet opening is suitably located in one end of the trough, near the gable thereof. However, inlet openings may also, as mentioned, be located at both ends, centrally in the through or in another desired manner. If the inlet openings are located elsewhere than from a location at one end, the spiral cylinder is divided into sections having a different direction of the spiral turn, so that the mass is fed towards the outlets.

The arrangement can, as above has been described, be designed and used so that there arises a pressure towards the outlet. In order to achieve a pumping function the spirals are designed, in a manner known to the expert, so that the gap between the spirals is closed or minimized. Herein also the gap between spiral cylinder and trough should be kept small, suitably only a few millimeters.

For controlling the consistency of the disintegrated mass under different processing conditions a dosing of dilution water is suitably used, which is proportional to the portion of total web width which is conveyed to the couch pit. Thereby the consistency of the couch mass can be controlled to approximately correspond to the consistency of the fresh stock, fed into the process.

The mass can also be treated by more than two spiral cylinders, in which case it is favorable to arrange the spiral cylinders in pairs so that each pair of spiral cylinders function as described above. Hereby it is preferred to arrange the pairs of spiral cylinders so that they together form a suction nip which draws a mass in between the spiral cylinders. If for several spiral cylinders a relatively high pressure level is desired, outlet openings should be arranged separately for each pair of spiral cylinders.

By the invention a compact system is achieved for treating, for instance, a broke mass of high consistency obtained in manufacturing of paper. Hereby it will be possible to bring the mass directly from the broke pit back to the process, whereby any delays in the quality adaptation can be avoided. Especially favorably this can be performed through a stock preparation according to patent application PCT/FI96/00052 by the same inventor.

In cases where the shredding and disintegration of a fibre bundle is especially critical, the invention can be combined with a de-stripper for treating the outgoing flow.

This is illustrated by the following example. If two spiral cylinders with a diameter of 600 millimeters having a core diameter of 300 millimeters rotate one turn a second, the circulation in the spiral cylinders would be totally 563 liters/second for each meter of machine width. At a web break the production of the paper machine, 10 tons/hours, corresponding to a net flow of 70 liters/second at a consistency of 4 percent, will be discharged towards the outlet in the pressure direction of the spirals. The circulation is 493 liters/second or 7 times larger than the net flow for each meter of width. This will flow along the channels, which provides good mixing efficiency.

One embodiment of the invention will now be described in more detail with reference to the appended drawings wherein FIG. 1 discloses a couch pit embodiment comprising a vessel or trough 10 having a discharge 12 at one gable end 16 and a spiral cylinder 20 located near a suitably semi-cylindrical portion, i.e., the bottom 11 of the trough 10. Sheets 30 of mass from trimmings from a paper machine fall down into the couch pit where they are collected in the form of a mass generally indicated by reference 32.

Figure 1:
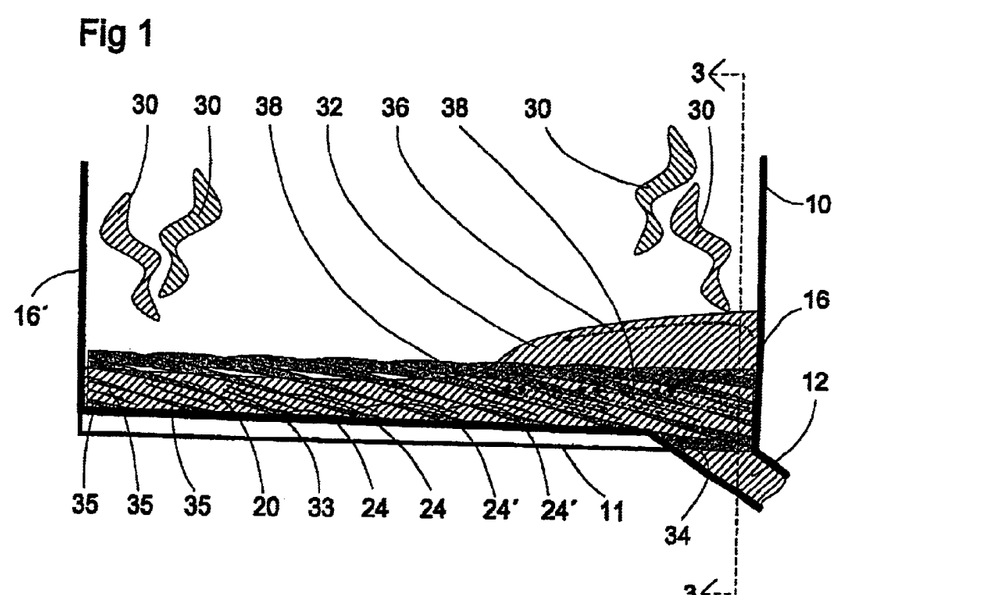
FIG. 1 shows a processing arrangement according to the invention, which arrangement is used as a couch pit in a paper machine, corresponding to section 1—1 in FIG. 2.
Figure 2:
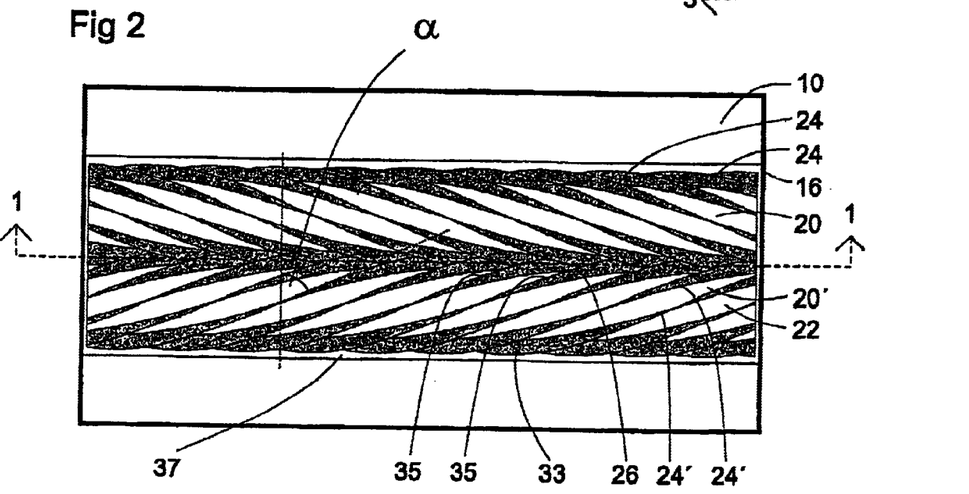
FIG. 2 shows a corresponding processing arrangement seen from above.
Figure 3:
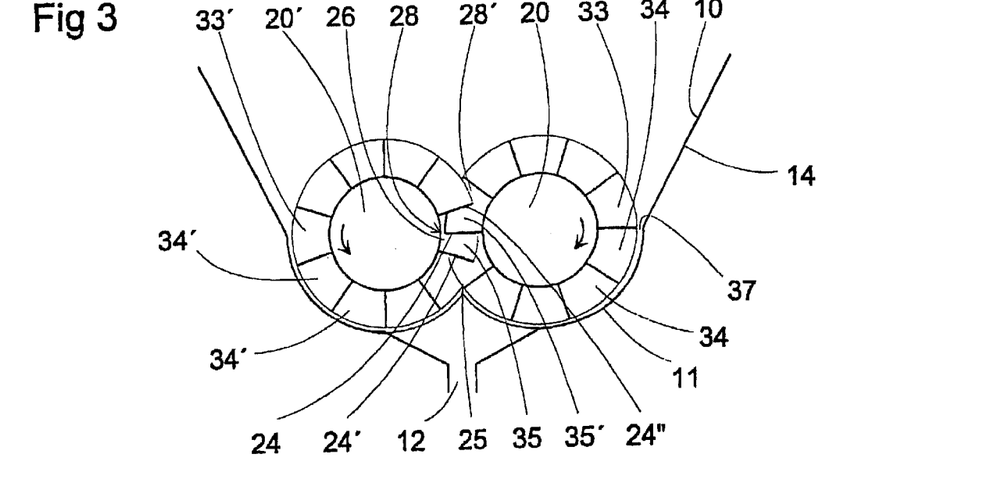
FIG. 3 shows an embodiment of the processing arrangement having ten spirals arranged on each spiral cylinder, corresponding to section 3—in FIG. 1, FIGS. 4a and 4b show corresponding sections in some other embodiments of the processing arrangement.

FIG. 2 discloses a section I—I of the couch pit according to FIG. 1 and an arrangement of two spiral cylinders 20, 20', each of which having a core 22 and 22', respectively, and six spirals 24, 24' arranged so that the spirals of the cylinders in the area between the cores 22, 22' intermesh, preferably so that an outer edge of said spiral cylinder's 20 respective spirals 24 will be close to the spiral cylinder's 20' core 22', whereby a gap 28 is formed as disclosed in FIG. 3. The shortest distance between the cores 22, 22' constitutes a constriction 26 where said spirals 24, 24' and, respectively, 24" interlace in mutual interdigitation.

Figures 4A, 4B:
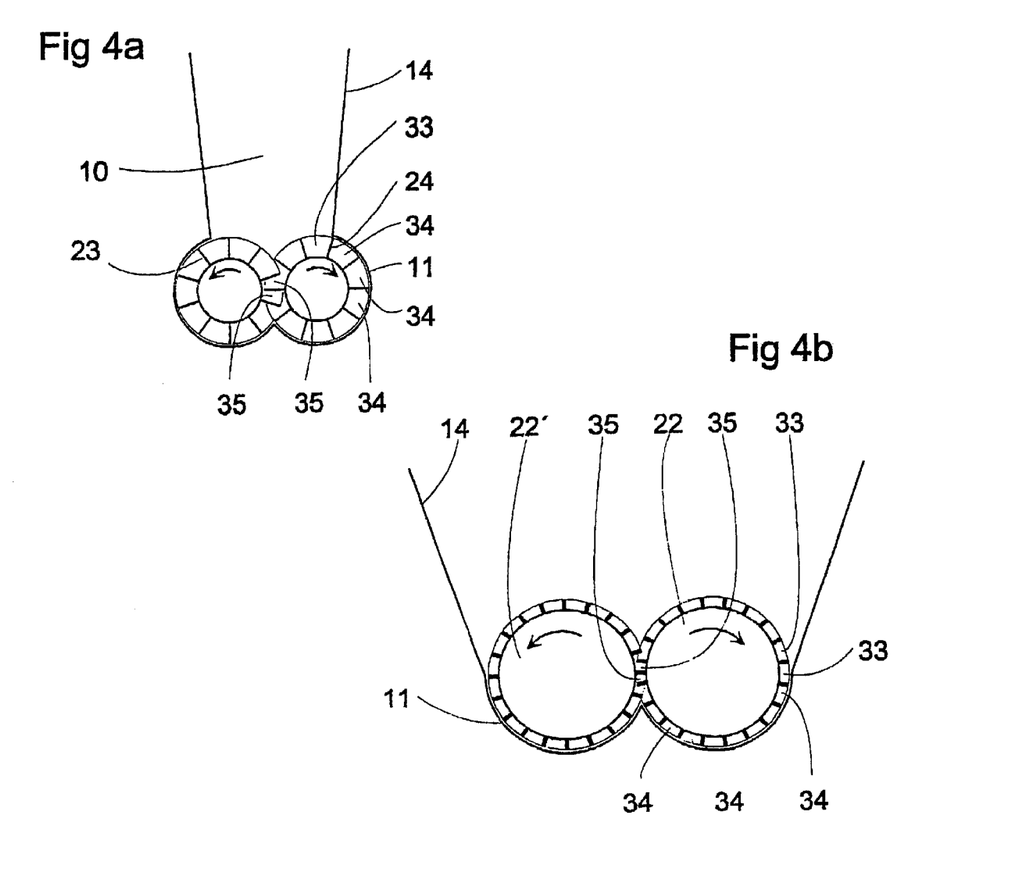

The number of spirals 24, 24' and 24" may be higher or lower than six for each spiral cylinder. Even though the invention functions with one single spiral on each spiral cylinder, six spirals usually is the most favorable, since these are needed to provide a more efficient labyrinth in the constriction 26. If the spiral cylinder, as disclosed in FIG. 4b, is designed to have a relatively larger core, the number of spirals should be higher, preferably up to forty or more, depending on the relationship between the diameters of the spiral and the core.

The spirals 24, 24', 24" and the cores 22, 22' form, between themselves, channels 35, 35', and together with the semicircular portion 11 of the trough, channels 34. Reference numeral 33 indicates such channels which at least partially comprise portions which are located outside the trough's 10 suitably semicircular portion 11 which essentially closely fits against said spirals 24, 24', 24". Gables 16, 16' are preferably arranged so that the gap between the gables 16, 16' and the spiral cylinders 20, 20' is small, whereby the channels indicated by reference numeral 34 at their ends will be essentially closed by said gables 16, 16'. Thus, the mass conveyed by the spirals towards the nip 25 will have its only outlet through the discharge 12 or the channels 35, 35'. At the end opposite to the discharges the channels 34 will be in direct contact with such channels 33 which are at least partially open and thus allow a flow mainly over the top of the cylinders 20, 20' and in a direction counter to the rotational direction of the spiral cylinder in a direction towards the discharge 12. Here it is to be observed that reference numerals 33, 34 and 35 indicate a relative partition of the channels in accordance with a certain property and in a position disclosed in the respective Figure, and that the properties of each specific channel with respect to openness and constriction will change as the relative positions of the respective channel changes due to the rotation of the cylinder 20.

Seen from above the spiral cylinders 20, 20' rotate outwards, whereby any mass 32 in the channels 22 will be drawn, due to the rotation of each respective spiral cylinder, towards the semi-cylindrical portion 11 of the trough and into channels 34 and further to an inner nip 25 where the spirals 24, 24', 24" intermesh, and further towards the constriction 26. Due to the spiral movement of the cylinders the mass 32 will be conveyed preferably towards the discharge end of the couch pit 10, at which end the level of the mass 32 will rise so that a return flow 36 is formed. In the channels referred to as 34, 34' closest to the gable 16, the gable will prevent the mass 32 from flowing forwards, and thus surplus mass will flow backwards instead as channel flows 38 along channels referred to as 35, 35' through the constriction 26. After having passed the constriction 26 the speed of the mass will slow down so that the mass flow will fill up the channels. Hereby the return flow 36 at the surface of the mass 32 will be conveyed over the channel flow 38 which among others contributes to preventing mass sheets 32 from being drawn directly to the discharge 12 prior to their being subjected to a sufficient mixing and shredding at the spiral cylinders 20, 20'.

To that part where the channels 34 are not shut by said gable 16 the mass 32 which does not follow the rotation of the spiral cylinders will favorably be forced forwards along the channels 34 towards the discharge end to the open channels 33 and will again be drawn towards the constriction 26. If the volume of the spiral structure itself is relatively small and frictional losses are discounted the portion of mass flowing forwards would be ⅔ in the present case, while the portion flowing backwards would be ⅓ of the total amount of mass circulating. If the spirals displace more volume, the amount of mass flowing forwards correspondingly increases.

During operation trimmings from the paper machine will fall as sheets 30 of paper mass down into said trough 10, whereby they are conveyed by the rotating spiral cylinders 20, 20' towards a nip 37 at the transition between the sides 14 of the trough 10 and its bottom 11 and onwards towards the constriction 26 between the spiral cylinders 20, 20'. When a sufficient amount of mass has been gathered in the trough 10, the space between said spirals 24, 24', 24" at the spiral cylinders 20, 20' will be filled with mass 32. Due to the rotation such mass which is located in the channels 33, 34 of the spirals will be conveyed towards the constriction 26 whereby the available channel volume between the spirals 24, 24', 24" will be reduced to about one half.

FIG. 2 discloses a pair of spiral cylinders 20, 20' seen from above and shows how spirals 24, 24' having opposite rotational directions intermesh. When a spiral cylinder is chosen one should take into consideration to leave a sufficiently large free surface between the spirals so that the broke actually falls into said channels 33 between the spirals and thus can be drawn with them into the channels 34.

FIGS. 4a and 4b discloses other embodiments of, e.g., a couch pit designed in accordance with the invention, the pit being designed to have an increased height. In FIG. 4a the spiral cylinders comprise ten spirals, in FIG. 4b twenty spirals each. The higher couch pits contain a buffer capacity for broke mass and they can be operated according to the same principles as conventional couch pits, i.e. with a level control and variable discharge pumping. Especially FIG. 4a shows how the transition between the side 14 and the semi-cylindrical bottom 11 of the trough 10 is designed to have a sharp edge against which said spirals 24 can cut sheets of mass. The embodiment according to FIG. 4b is especially favorable since the high volume cores 22, 22' will displace mass, whereby the amount of mass in the treatment arrangement is kept small.

Figure 5:
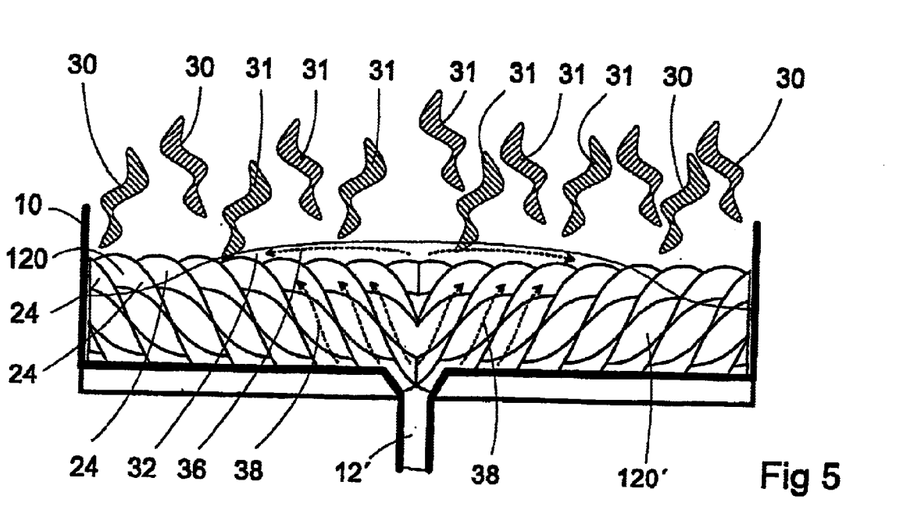
FIG. 5 shows a section of a couch pit having a central outlet.

FIG. 5 shows, as an example, a couch pit having a central discharge. The spirals 24 are designed to have two sections 120, 120' having different turning directions so that they force the mass towards a centrally located discharge 12'. The Figure shows the situation during a web broke when in addition to trimmings 30 also broke 31 will fall into the couch pit which is loaded over its whole width. In a break situation the flow through the couch pit will increase to a multiple of normal operation. Then it may be favorable also to increase the rotational speed of the spiral cylinders and thereby also their shredding and pumping efficiency. For this reason they are preferably provided with a driving device having a variable rotation. For controlling the operation of the arrangement it may also be preferable to provide each respective discharge, and in some cases also each respective inlet, with choke means (not shown), thus facilitating the control of the essential operative parameters of the arrangement.

Since the removal of mass through the discharge is less than the conveyor capacity of the spiral cylinders 20, 20', the mass 32 will be pressed through the constriction 26 and the gaps at the spiral cylinders, which brings about a collection of mass on top of the spiral cylinders. Also on the upper side the spiral cylinders will convey mass 32 generally towards the location of the discharge 12 which will bring about a level rise there and further to a recirculation of the surface mass, which causes broke and trimmings to be conveyed especially away from said discharge prior ro their being drawn into the channels 34. Thereby they will pass through a large portion of the spiral which enhances the probability that fibre bundles and lumps of mass will be subjected to shredding and thus disintegrated. The same effect can also be seen in FIG. 1, even though the falling mass here is conveyed towards one end of the trough.

Figure 6A:
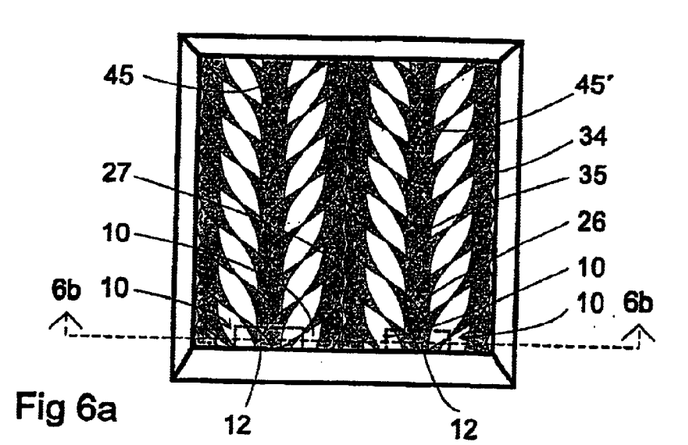
FIGS. 6a and 6b show a processing arrangement having two pairs of spiral cylinders, seem from above and, respectively, in section 6b—6b, and FIG. 7 schematically shows the use of the processing arrangement as a couch pit in a paper machine.
Figure 6B:
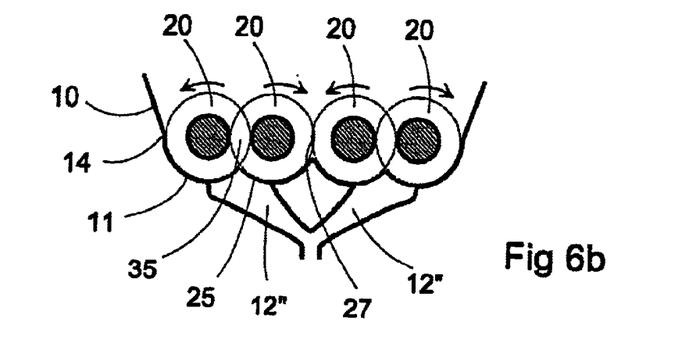

In cases where a broad couch pit is needed it is preferred to use more than two spiral cylinders, as disclosed in FIGS. 6a and 6b. In this case four cylinders have been arranged. It is favorable to arrange the spiral cylinders in pairs 45, 45' so that the nip 27 which is formed between the most central cylinders and where said cylinders draw mass downwards is made so broad that it does not prevent the movement of the mass in the same manner as constrictions 26 in the upwards leading nips. When several pairs 45, 45' of cylinders are applied it is favorable to arrange separate discharges 12" for each pair of cylinders, whereby the pairs 45, 45' of cylinders can build up a pressure in front of the respective discharge 12' and effectively convey the mass 32 towards it.

Figure 7:
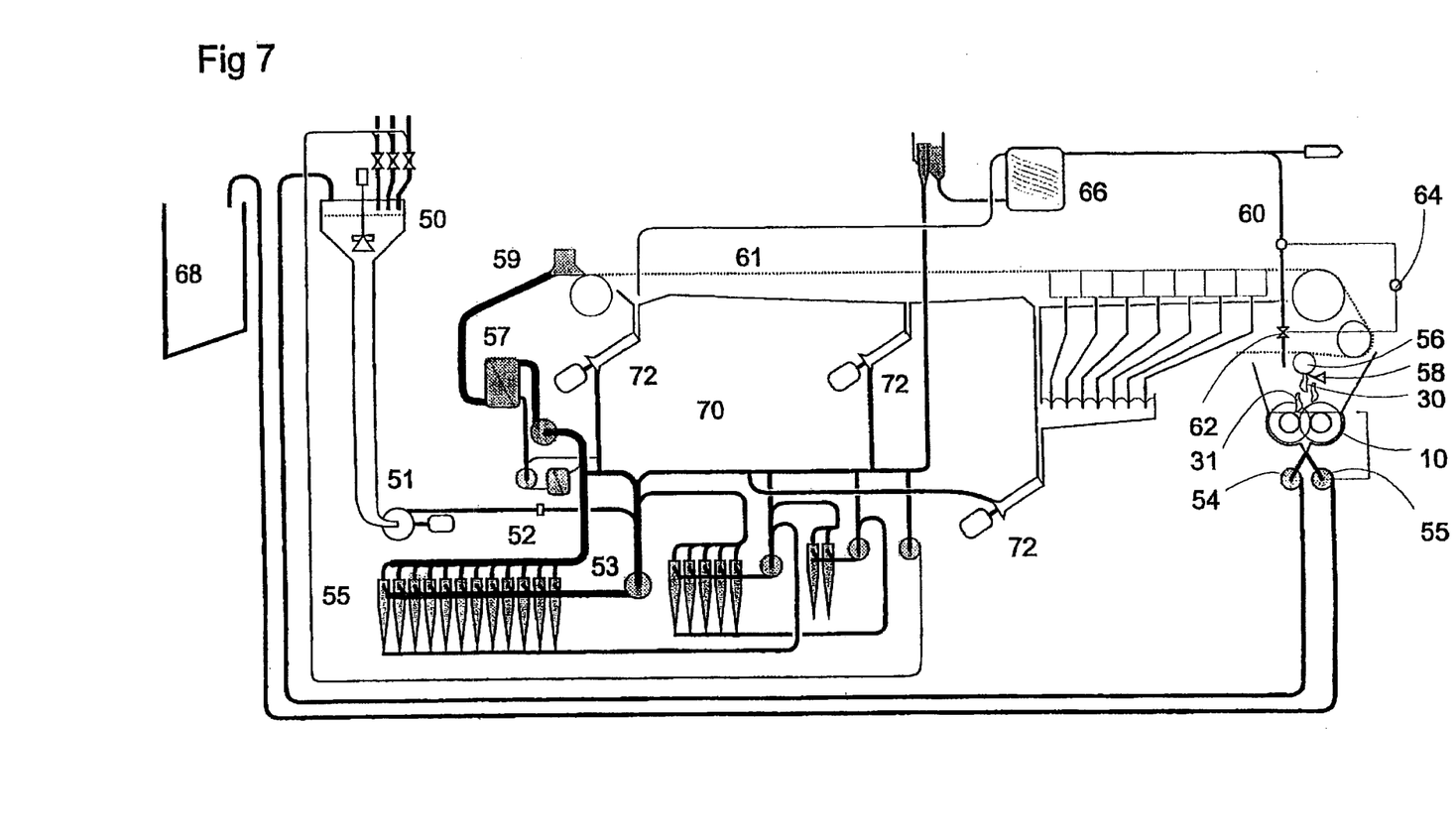

FIG. 7 discloses a preferred use of a processing arrangement according to the invention as a couch pit in connection with a paper making process where the paper machine is supplied with mass from a compact stock preparation 50 according to patent application PCT/FI96/00052 by the same inventor. Stock is pumped to the short circulation of the machine by a stock pump 51, which is controlled so that the dry flow of stock over a sensor 52 is kept at a desired level. The stock is diluted in a conventional manner in a mixer pump 53 and fed over a cyclone cleaner 55 and a screen 57 to the headbox 59 and a wire section 61. Backwater draining from the wire section is distributed into partial flows in accordance with Finnish Patent No. 89728 by the same inventor and fed back to the process through air separating pumps 72 according to Finnish Patent Application No. 935853 by the same inventor. Surplus water is fed over a level box to fibre recovery 66.

Trimmings 30 and broke 31 falling down at the paper production are brought over a wire guide roller 56 wherefrom they are dropped into the couch pit 10 by a doctor blade 58. Dilution water for diluting couch mass is fed by a dilution water conduit 60, the amount of water being controlled by a valve 62 controlled by a valve 62 controlled by a flow regulator 64 so that the amount of water is kept proportional in relation to the amount of couch mass fed. The dilution water is favorably filtered or clear water from fibre recovery 66. By selecting the consistency of the diluted couch mass so that it corresponds to the consistency of the fed fresh stock one achieves a situation in which the water from the fibre recovery 66 in all conditions of operation is sufficient for the dilution, no water reservoir being needed for this purpose.

During normal operation the diluted couch mass is pumped by a pump 54 to stock preparation 59. At a web break the amount of couch mass will increase and thus also the flow of dilution water, whereby at least a part of the increased amount is fed to a broke container 68. Preferably this is done with a broke pump 55, while the pump 54 can be dimensioned for less flow. The discharge flow from the couch pit 10 is favorably controlled so that the level in the couch pit is maintained, by a pump 54, constant up to a pre-defined maximum variable flow, while the broke pump 55 is started immediately when the capacity of said pump 54 has been exceeded so that a pre-defined maximum level has been exceeded, in which case the level control is taken over by the broke pump 55 until the maximum level has been recovered.

The invention has been described mainly as applied to paper making and treatment of couch mass in connection thereto. The use of the invention is, however, not restricted to this application, but it can also be extended to many other situations. Thus, the invention can be utilized in production and returning of, e.g., chemical engineering products, concrete, etc.

Above some favorable embodiments of the invention have been discussed but for the expert it is clear that the invention can be varied in many other ways within the scope of the appended claims.

What is claimed is:

1. A method for treating a fluid mass comprising feeding a mass material to a vessel or trough having a mixing device;
   said mixing device comprising rotatably arranged processing means;
   wherein at least two of said processing means are caused to rotate in opposite directions and substantially horizontally adjacent to one another;
   the method further comprising conveying the mass at the upper surface of the means out towards the respective opposite portions of the vessel or the trough, wherein the opposite portions are delimited in the radial direction of the processing means;
   bringing the mass, using a plurality of spiral elements arranged in an inclined manner at a substantially cylindrical core of each respective processing means, into horizontal channels arranged in an inclined manner;
   which channels are defined the core, by opposite wall portions of respectively two adjacent spiral elements,
   and by wall portions of the vessel which are adjacent to the spiral elements; and
   bringing the mass towards a constriction formed by intermeshed spiral elements arranged, respectively, at each two of said processing means rotating in opposite directions while disposed adjacent to each other.

2. The method according to claim 1 further including bringing a part of the mass to be forced towards at least one discharge arranged in the vessel or trough by controlling the rotation of the spiral elements, and, respectively, the pitch of the spiral elements around the core or by additionally controlling at least one of an inlet or outlet parameter for the vessel or trough, while forcing the rest of the mass under the impact of at least one gable wall of the vessel or trough or under the impact of spirals working counter to each other in an intermeshed manner, or under the impact of both at least one gable wall of the said vessel and the spirals, through the channels and in a direction away from the discharge or over the upper surface of the processing means, or away from the discharge as well as over the upper surface of the processing means to be combined with an added feed of mass.

3. A method for treating a fluid mass comprising introducing a mass and dilution water into a couch pit comprising a vessel or trough and a mixing arrangement, the method further including bringing at least two substantially horizontally arranged spiral cylinders of the mixing arrangement to rotate in an intermeshed manner counter to each other, thereby conveying the mass by means of spirals arranged at the spiral cylinders, wherein the mass falls down into the couch pit from above;
   drawing the mass into channels formed by adjacent spirals by cores of the cylinders and by a wall of the vessel or trough, whereby the mass is conveyed towards a constriction formed by the cylinder cores and the intermesh of the spirals, thus forcing a part of the mass against at least one discharge, while re-circulating a part of the mass in channels formed at the constrictions; and
   forcing surplus back through the channels.

4. The method according to claim 3 further comprising controlling the amount of dilution water in accordance with the width of a paper web falling down, which paper web comprises a couch mass, to a consistency corresponding to the consistency of fresh stock in a paper making process.

5. The method according to claim 4 wherein the mass is returned to a stock processor without prior thickening.

6. The method according to claim 4 further comprising restricting an amount of couch mass returned to a pre-defined proportion of the total mass while feeding surplus mass to a collector tank so that the level in the couch pit is restricted at a change in a paper machine to a minimum by controlling the rotation of the spiral cylinders or by controlling a choke arranged at the discharge.

* * * * *